Patented Dec. 15, 1942

2,305,460

UNITED STATES PATENT OFFICE 2,305,460

QUATERNARY SALTS OF SCOPOLAMINE AND PROCESS FOR THEIR PRODUCTION

Georg Scheuing and Wilhelm Krauss, Ingelheim-on-the-Rhine, Germany; vested in the Alien Property Custodian No Drawing. Application April 23, 1940, Serial No. 331,128. In Germany May 25, 1939

9 Claims. (Cl. 260—292)

This invention relates to new quaternary salts of scopolamine and a process of producing the same.

As known, methyl atropinium nitrate has a stronger although less prolonged an action than atropine. The proportion of the activities of both these substances amounts to about 2:1. The higher homologues, as the n-butyl or n-propylatropinium salts are practically as active as the methyl compound.

It has been found that the methyl scopolaminium salts have stronger action than scopolamine, the increase in the activity amounting to about the twofold. It is surprising that the action of the higher homologues differs from that of the atropine and amounts to the manifold of the action of scopolamine itself. So for instance n-propylscopolaminium bromide, when introduced subcutaneously has, measured at the mouse eye a 40-times, and the n-butylscopolaminium salt, measured at the rabbit eye—a 10-times as strong an action as scopolamine.

The above named higher quarternary salts cannot be easily obtained in the usual way by reacting the corresponding alkylesters with highly strong acids and the base, as the capability of reacting of these higher alkylesters is not great enough for producing an addition compound without danger of racemisation or another decomposition. On the contrary, allylesters, such as crotonyl bromide, are able to form addition compounds with scopolamine in the shortest time at room temperature.

According to the invention, the production of quarternary salts of scopolamine is therefore based on the addition of unsaturated alkylesters of strong acids, such as allyl or crotonylester to the free base, the obtained quarternary salt, containing the unsaturated alkyl groups, being then converted into the saturated compounds by usual reduction, for instance by catalytic hydrogenation. As esters of strong acids may be named the esters of halogen hydracids, sulphuric acid, sulphonic acids, such as benzene or toluene sulphonic acid and the like.

When carrying out the process according to the invention, the scopolamine is dissolved in organic solvents, such as alcohol, benzene, chloroform and the like and the solution mixed with the corresponding allyl or crotonylester. The quantities of scopolamine and ester should correspond to the proportion of 1:1, but an excess in ester may also be used. The reduction of the quarternary scopolamine compounds, containing unsaturated alkyl groups, takes place by way of the catalytic hydrogenation, using the normal catalysts for hydrogenation, such as platinum, palladium, nickel or copper. The corresponding compounds are dissolved in the usual solvents, such as methyl alcohol, aqueous ethyl alcohol or glacial acetic acid.

In the following the process, according to the invention, may be explained on the basis of some examples, no limitation of the invention to the initial materials, proportions of their quantities, temperatures, etc., as stated in the examples, being intended.

Example 1

28 parts of scopolamine purum are dissolved in 100 cc. of alcohol and 28 cc. of crotonyl bromide added. After some time crystallisation takes place. 24 hours later the scopolamine bromcrotonylate is sucked off, washed and dried. Melting point: 98° C.; yield: 88%.

35 parts of scopolamine bromcrotonylate are dissolved in methyl alcohol, 5 grs. of 10% palladium charcoal added and treated with hydrogen at room temperature. The hydrogenation is finished as soon as 1 mol. of hydrogen is taken up. The catalyst is sucked off, the solvent as far as possible distilled off and the scopolamine brombutylate formed precipitated with ether. Melting point: 195–197° C.; yield: 78%.

Example 2

6.6 grs. of scopolamine are dissolved in 12 cc. of absolute methyl alcohol and 6 cc. of allyl bromide added. The solution is allowed to stand during 24 hours at room temperature and ether is then added until the liquid becomes turbid, after which the scopolamine bromallylate crystallises out. Yield: 9 grs.; melting point under decomposition at 165–166° C.

14 grs. of scopolamine bromallylate are dissolved in 150 cc. of methyl alcohol, 5 grs. of 10% palladium charcoal added and treated with hydrogen, 1 mol. of the latter being taken up. The filtrate is concentrated and the scopolamine brompropylate formed is precipitated with ether. Yield: 12 grs.; melting point: 194° C.

We claim:

1. Process for the production of quarternary salts of scopolamine, consisting in the addition of unsaturated alkylesters of strong acids to scopolamine and in the catalytic hydrogenation of the compounds formed, said unsaturated alkyl compounds having the following structural formula:

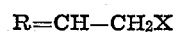

wherein R is a hydrocarbon radical having from 1 to 2 carbon atoms, and X is the radical of a strong acid.

2. Process as specified in claim 1, consisting in the addition of allylesters of strong acids to scopolamine.

3. Process as specified in claim 1, consisting in the addition of crotonylesters of strong acids to scopolamine.

4. Process as specified in claim 1, consisting in the addition of a member of the group consisting of allyl and homologous esters of halogen hydracids.

5. Process for the production of quarternary salts of scopolamine, consisting in dissolving the scopolamine in suitable organic solvents for allyl and homologous esters, in reacting the solution with a member of the group consisting of allyl and homologous esters of strong acids and in reducing the compound formed with hydrogen in the presence of usual catalysts for hydrogenation.

6. As new substances the quarternary salts of scopolamine with a member of the group consisting of propyl esters of strong acids and butyl esters of strong acids.

7. As new substances the quarternary salts of scopolamine with the butylesters of strong acids.

8. As a new substance the scopolamine brombutylate with a melting point of 195–197° C.

9. As a new substance the scopolamine brompropylate with a melting point of 194° C.

GEORG SCHEUING.
WILHELM KRAUSS.